(12) United States Patent
Zhang et al.

(10) Patent No.: US 6,475,837 B2
(45) Date of Patent: Nov. 5, 2002

(54) ELECTRO-OPTICAL DEVICE

(75) Inventors: Hongyong Zhang, Kanagawa (JP); Naoaki Yamaguchi, Kanagawa (JP); Yasuhiko Takemura, Kanagawa (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/850,886

(22) Filed: May 7, 2001

(65) Prior Publication Data

US 2001/0029071 A1 Oct. 11, 2001

Related U.S. Application Data

(63) Continuation of application No. 09/360,841, filed on Jul. 22, 1999, now Pat. No. 6,246,453, which is a continuation of application No. 08/881,182, filed on Jun. 24, 1997, now Pat. No. 5,982,460.

(30) Foreign Application Priority Data

Jun. 25, 1996 (JP) ............................................. 8-185638

(51) Int. Cl.[7] .............................................. H01L 21/00
(52) U.S. Cl. ......................... 438/149; 438/153; 438/640
(58) Field of Search ............................ 257/72, 40, 79; 438/30, 149, 153, 640, 713, 701, 708, 709; 349/43, 42, 133, 141, 138, 39

(56) References Cited

U.S. PATENT DOCUMENTS

| | | | |
|---|---|---|---|
| 5,474,942 A | 12/1995 | Kodaira et al. | |
| 5,573,959 A | 11/1996 | Kodaira et al. | |
| 5,650,637 A | 7/1997 | Kodaira et al. | |
| 5,677,547 A | 10/1997 | Kodaira et al. | |
| 5,849,601 A * | 12/1998 | Yamazaki | 437/101 |
| 5,940,732 A * | 8/1999 | Zhang | 438/640 |
| 5,982,460 A * | 11/1999 | Zhang et al. | 349/39 |
| 5,990,542 A * | 11/1999 | Yamazaki | 257/642 |
| 6,005,648 A * | 12/1999 | Zhang et al. | 349/43 |
| 6,037,608 A | 3/2000 | Kodaira et al. | |
| 6,097,454 A * | 8/2000 | Zhang et al. | 349/43 |
| 6,115,090 A * | 9/2000 | Yamazaki | 349/42 |
| 6,246,453 B1 * | 6/2001 | Zhang et al. | 349/39 |
| 6,271,543 B1 * | 8/2001 | Ohtani et al. | 257/72 |
| 6,387,737 B1 * | 5/2002 | Yamazaki et al. | 438/149 |

* cited by examiner

Primary Examiner—Olik Chaudhuri
Assistant Examiner—Laura M Schillinger
(74) Attorney, Agent, or Firm—Fish & Richardson P.C.

(57) ABSTRACT

An auxiliary capacitor for a pixel of an active matrix type liquid crystal display is provided without decreasing the aperture ratio. A transparent conductive film for a common electrode is formed under a pixel electrode constituted by a transparent conductive film with an insulation film provided therebetween. Further, the transparent conductive film for the common electrode is maintained at fixed potential, formed so as to cover a gate bus line and a source bus line, and configured such that signals on each bus line are not applied to the pixel electrode. The pixel electrode is disposed so that all edges thereof overlap the gate bus line and source bus line. As a result, each of the bus lines serves as a black matrix. Further, the pixel electrode overlaps the transparent conductive film for the common electrode to form a storage capacitor.

15 Claims, 4 Drawing Sheets

ELECTRO-OPTICAL DEVICE

This is a continuation of U.S. application Ser. No. 09/360,841, filed Jul. 22, 1999, now U.S. Pat. No. 6,246,453, which is a continuation of Ser. No. 08/881,182, filed Jun. 24, 1997, now U.S. Pat. No. 5,982,460.

BACKGROUND OF THE INVENTION

1. Field of the Invention

The invention disclosed in this specification relates to a configuration of a pixel region of an active matrix type liquid crystal display and, more particularly, to a configuration of an auxiliary capacitor connected to a pixel electrode in parallel and a configuration of a black matrix for preventing leakage of light at boundaries between adjacent pixels.

2. Description of Related Art

Liquid crystal displays having an active matrix circuit are known. They have a configuration including a plurality of source bus lines for transmitting image data, a plurality of gate bus lines for transmitting switching signals in an intersecting relationship therewith, and a plurality of pixels provided at those intersections. Normally, transistors (specifically thin film transistors) are used as switching elements.

A pixel includes not only a transistor for switching but also a pixel electrode and has a structure in which the gate electrode, source, and drain of the transistor are connected to a gate bus line, a source bus line, and the pixel electrode, respectively. Distinction between the source and drain of a transistor is not fixed during the operation thereof and varies depending on signals according to a common definition of electrical circuits. In the following description, however, the terms "source" and "drain" simply refer to impurity regions provided in a transistor which are connected to a source bus line and a pixel electrode, respectively.

Each pixel includes one or more transistors. Specifically, two or more transistors connected in series are advantageous in that leak current can be reduced even when the transistors are not selected. The above-described definition is also applied to such a case, and no definition is given to an impurity region connected to neither a source bus line nor a pixel electrode.

A capacitor is formed between a pixel electrode and an electrode which is opposite to the pixel electrode across liquid crystal. A transistor as described above serves as a switching element for supplying and removing electrical charge to and from this capacitor.

In an actual operation, however, the capacity of the pixel electrode portion is too small to store necessary electrical charge for a sufficient period of time by itself. It is therefore necessary to provide a separate auxiliary capacitor.

Such an auxiliary capacitor (also referred to as "storage capacitor") has been formed between an opaque conductive material such as a metal which is separately provided and a pixel electrode or a semiconductor layer. The gate bus line for the next row has been normally used as the opposite electrode. Although a capacitor formed using a gate bus line has been sufficient when the area of the pixel is large enough, a gate bus line has been unsuccessful in providing a sufficient capacity by itself when the area of the pixel is small. This has required a gate bus line to be expanded to accommodate the area for an electrode of an auxiliary capacitor. Such a structure results in a decrease in the aperture ratio because a pixel includes an area where light is blocked.

It is an object of the invention disclosed in this specification to provide a configuration wherein an auxiliary capacity is increased without reducing the aperture ratio of a pixel. It is another object of the invention to provide a configuration of a black matrix for solving the problem of leakage of light that occurs at boundaries between adjoining pixels.

SUMMARY OF THE INVENTION

The invention disclosed in this specification is characterized in that:

a pixel includes a pixel electrode comprising a first transparent conductive film;

the pixel electrode overlaps a gate bus line and a source bus line;

a layer of a common electrode comprising a second transparent conductive film is provided between the gate bus line and the pixel electrode and between the source bus line and the pixel electrode such that it covers the gate bus line and source bus line; and the common electrode is maintained at constant potential.

Specifically, the common electrode is disposed such that it covers the bus lines, and the pixel electrode is disposed such that it overlaps the bus lines. Thus, the common electrode and the pixel electrode overlap each other, and this overlap provides an auxiliary capacitor. In addition, while at least one of the electrodes of a conventional auxiliary capacitor has been formed of an opaque material, both of such electrodes are formed of a transparent material according to the present invention. Thus, they will not hinder display and the aperture ratio is maintained.

With the above-described configuration, a black matrix can be formed by source bus lines and gate bus lines by arranging pixel electrodes in an overlapping relationship with the source bus lines and gate bus lines and by positioning boundaries between the pixel electrodes on the source bus lines and gate bus lines. In general, boundaries between pixel electrodes of a liquid crystal display are affected by the electric field of the adjacent electrodes. As a result, at such boundaries, an image can be produced differently from that to be formed by the relevant pixels or leakage of light can occur due to absence of an electric field.

It is therefore not appropriate to use such boundaries between pixel electrodes, and a structure is normally employed in which such areas are shaded by a black matrix. It has been conventionally necessary to configure a black matrix by a separate layer. For example, the use of bus lines as a black matrix has been proposed in Japanese unexamined patent publication (KOKAI) No. H6-216421 and etc. In practice, however, this results in unstable display because signals on bus lines affect pixel electrodes.

The present invention solves this problem. Specifically, since a common electrode is provided between a bus line and a pixel electrode, a signal on the bus line is blocked by the common electrode and hence does not affect the pixel electrode.

When a top-gate type transistor (a transistor having a structure in which the gate electrode is provided on top of a semiconductor layer) is used as a switching transistor, it will be advantageous for stable operation of the transistor if light is allowed to be incident upon the substrate primarily from above, i.e., from the side of the pixel electrodes because this prevents light from entering the semiconductor layer under the gate electrode.

The effect of shading can be further improved for more stable operation by providing a film made of the same material as the layer of the source bus lines on top of the gate bus lines where the semiconductor layer and the gate bus lines intersect with each other.

As an insulator to be used between the common electrode and the pixel electrode, organic resin may be used as well as inorganic materials (e.g., silicon oxide and silicon nitride).

Especially, a flat insulation layer formed by means of spin coating or the like will be effective in reducing surface irregularity for improved uniformity of an electric field applied to liquid crystal molecules.

Materials usable for the transparent conductive film according to the invention disclosed in this specification include ITO (indium tin oxide), $SnO_2$, and materials mainly composed of those materials as well.

DETAILED DESCRIPTION OF PREFERRED EMBODIMENTS

A first embodiment of the present invention will now be described. FIGS. 1A through 1E and FIGS. 2A through 2D show a configuration of a pixel of an active matrix type liquid crystal display which employs the invention disclosed in this specification. FIGS. 1A through 1E are schematic sectional views showing fabrication steps according to the present embodiment, and FIGS. 2A through 2D show the configuration of each of a bus line, a common electrode, pixel electrodes, a semiconductor layer, and the like according to the present embodiment. The reference numbers in FIGS. 2A through 2D are in correspondence with those in FIGS. 1A through 1E. FIGS. 1A through 1E are conceptual views and are not exactly identical to FIGS. 2A through 2D in configuration.

Further, FIGS. 1A through 1E and FIGS. 2A though 2D show a configuration of only a substrate on which a thin film transistor is provided. In practice, there is provided another substrate opposite thereto (opposite substrate), and liquid crystal is held between the opposite substrate and the substrate shown in FIGS. 1A through 1E with a gap of several μm therebetween.

Figure 1A:
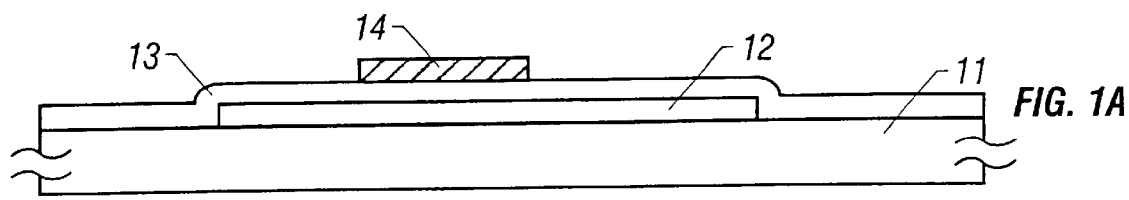
FIGS. 1A through 1E are sectional views showing fabrication steps according to a first embodiment of the present invention.

The fabrication steps will now be described with reference to FIGS. 1A through 1E. As shown in FIG. 1A, a semiconductor layer (active layer) 12 of a transistor is provided on a glass substrate 11 having an underlying silicon oxide film (not shown).

The active layer 12 is formed by a crystalline silicon film which has been crystallized by heating an amorphous silicon film or by irradiating the same with laser beams. A gate insulation film 13 is formed so as to cover the active layer 12. The gate insulation film 13 is preferably made of silicon oxide or silicon nitride and, for example, a silicon oxide film formed using a plasma CVD process may be used. A gate bus line (gate electrode) 14 made of an aluminum-titanium alloy is formed on the gate insulation film using a well known sputtering process (FIG. 1A).

Figure 2A:
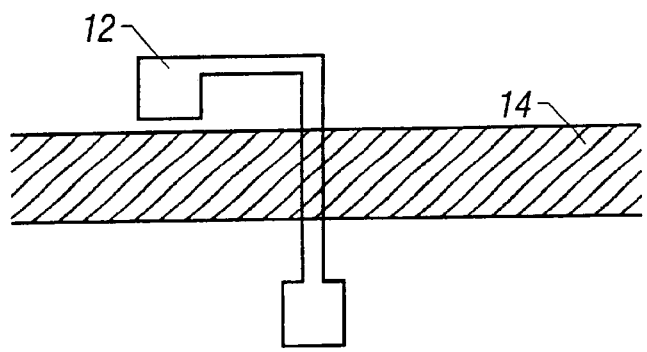
FIGS. 2A through 2D illustrate the configuration of wiring and the like according to the first embodiment of the invention.

The configuration of this circuit in this state is shown in FIG. 2A.

Next, a well known ion doping process is performed using the gate bus line as a mask to introduce N- or P-type impurities in the active layer, thereby forming a source 15 and a drain 16. After the impurities are introduced, thermal annealing, laser annealing or the like may be performed to activate the impurities (to recrystallize the semiconductor film) if required.

Figure 1B:
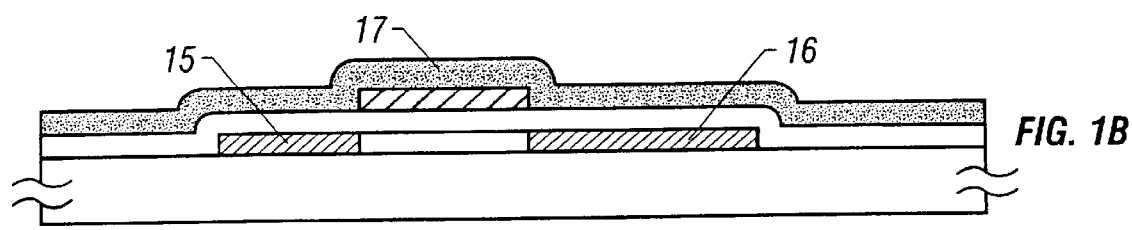

After the above-described steps, a silicon nitride film (or a silicon oxide film) 17 is deposited by means of a plasma CVD process. It serves as a first layer insulator (FIG. 1B).

Next, contact holes are formed in the first layer insulator 17 such that they reach the source 15 and drain 16. Then, a well known sputtering process is performed to form a multi-layer film of titanium and aluminum which is in turn etched to form a source bus line 18 and a drain electrode 19.

Figure 1C:
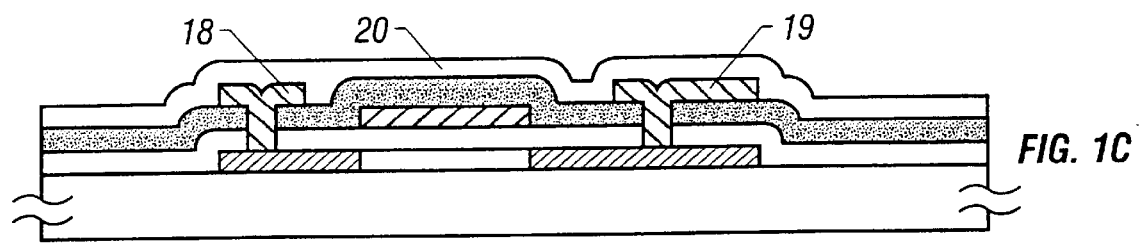

After the above-described steps, a silicon nitride film (or a silicon oxide film) 20 is deposited by means of a plasma CVD process. It serves as a second layer insulator (FIG. 1C).

Figure 2B:
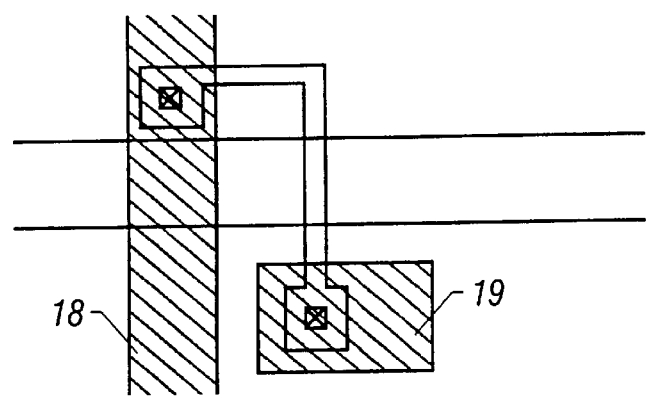

The configuration of the circuit in this state is shown in FIG. 2B.

Figure 1D:
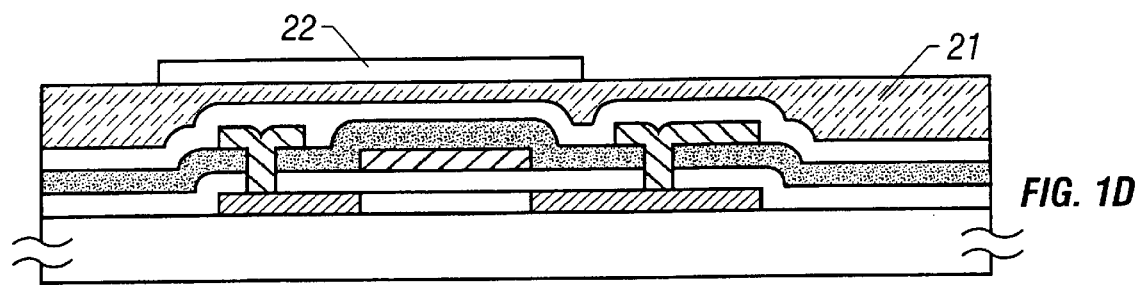

Next, a spin coating process is performed to form a first organic resin layer 21. The organic resin layer is formed to have a flat upper surface. Then, a well known sputtering process is performed to form an ITO film which is in turn etched to form a common electrode 22 (FIG. 1D).

Figure 2C:
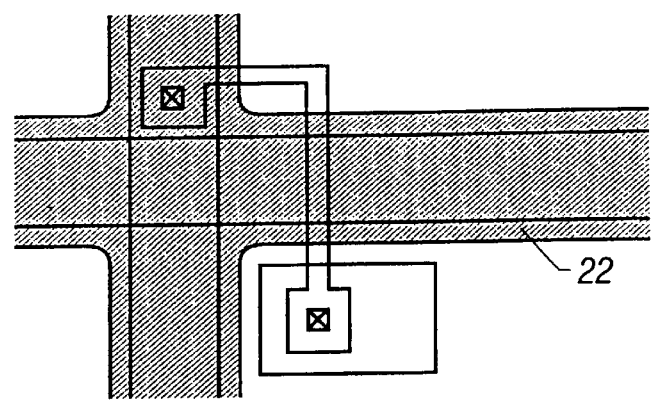

The configuration of the circuit in this state is shown in FIG. 2C. The common electrode is shaded in FIG. 2C to show its position clearly. As apparent from FIG. 2C, the common electrode is formed so as to cover the source bus line and gate bus line.

Figure 1E:
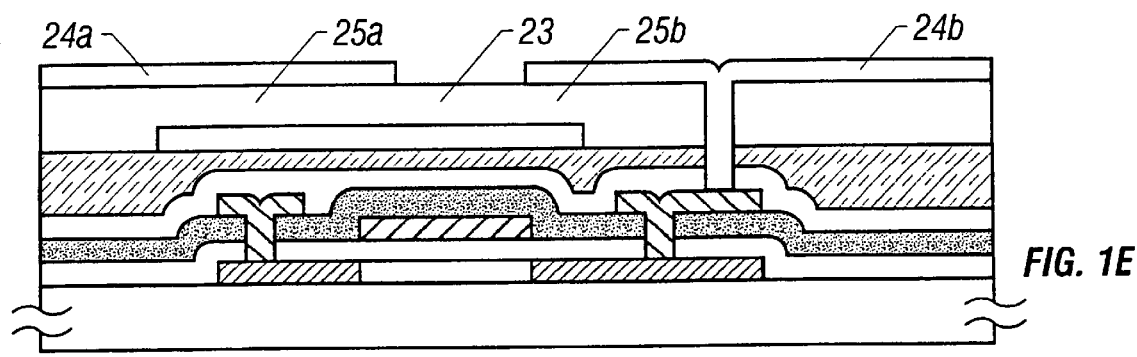

Further, a spin coating process is performed to form a second organic resin layer 23. Then, a well known sputtering process is performed to form an ITO film which is in turn etched to form pixel electrodes 24a and 24b. The pixel electrode 24b is a pixel electrode for the transistor as described above, and the pixel electrode 24a is a pixel electrode adjacent thereto. Capacitors 25a and 25b are respectively formed at regions where the pixel electrodes 24a and 24b overlap the common electrode 22 (FIG. 1E).

Figure 2D:
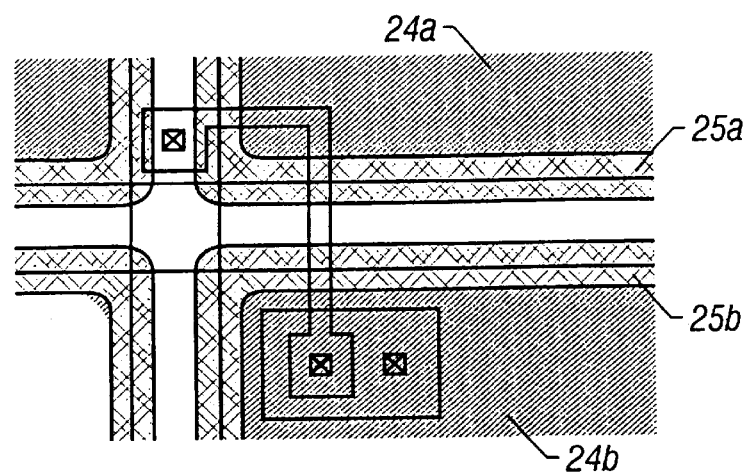

The configuration of the circuit in this state is shown in FIG. 2D. In FIG. 2D, the pixel electrodes and the regions where the pixel electrodes overlap the common electrode (regions where the capacitors are located) are shaded to show their positions clearly. As apparent from FIG. 2D, the pixel electrodes are formed so as to overlap the source bus line and gate bus line. As a result, the boundaries of the pixel electrodes are all located on the bus lines which consequently serve as a black matrix (FIG. 2D).

A second embodiment of the present invention will now be described. FIGS. 3A through 3E and FIGS. 4A through 4D show a configuration of a pixel of an active matrix type liquid crystal display which employs the invention disclosed in this specification. FIGS. 3A through 3E are schematic sectional views showing fabrication steps according to the present embodiment, and FIGS. 4A through 4D show the configuration of each of a bus line, a common electrode, pixel electrodes, a semiconductor layer, and the like according to the-present embodiment. The reference numbers in FIGS. 4A through 4D are in correspondence with those in FIGS. 3A through 3E. FIGS. 3A through 3E are conceptual views and are not exactly identical to FIGS. 4A through 4D in configuration.

Figure 3A:
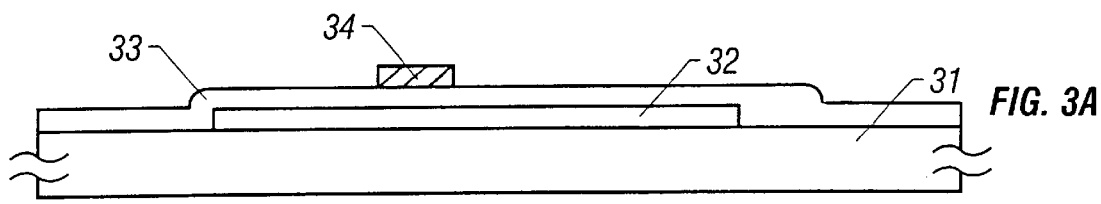
FIGS. 3A through 3E are sectional views showing fabrication steps according to a second embodiment of the present invention.

As shown in FIG. 3A, a semiconductor layer (active layer) 32 of a transistor is provided on a glass substrate 31 having an underlying silicon oxide film (not shown). A gate insulation film 33 is formed so as to cover the active layer 32. A gate bus line (gate electrode) 34 made of an aluminum-titanium alloy is formed on the gate insulation film (FIG. 3A).

Figure 4A:
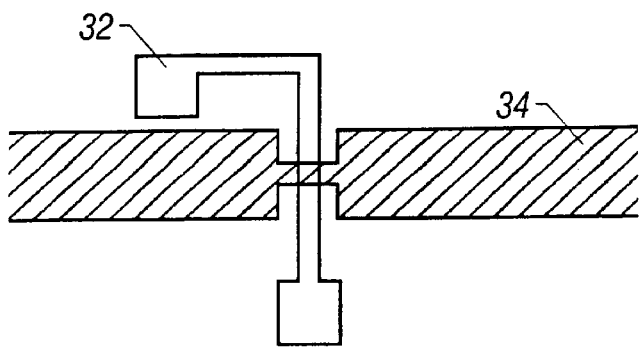
FIGS. 4A through 4D illustrate the configuration of wiring and the like according to the second embodiment of the invention.

The configuration of this circuit in this state is shown in FIG. 4A. Unlike the first embodiment, the gate bus line of the present embodiment is configured to be reduced in width at the region of the gate electrode of the transistor (FIG. 4A).

Figure 3B:
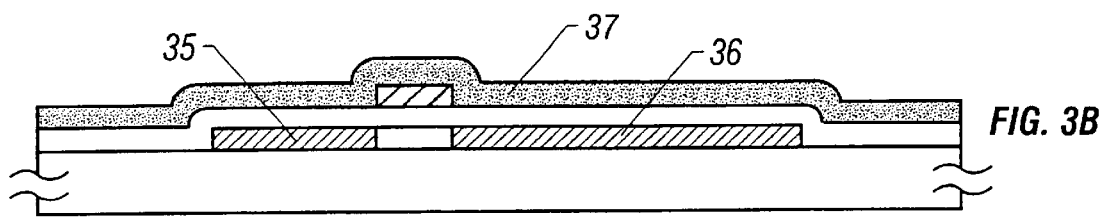

Next, N- or P-type impurities are introduced to form a source 35 and a drain 36. After the above-described steps, a first layer insulator 37 which is a silicon nitride film (or a silicon oxide film) is deposited (FIG. 3B).

Figure 3C:
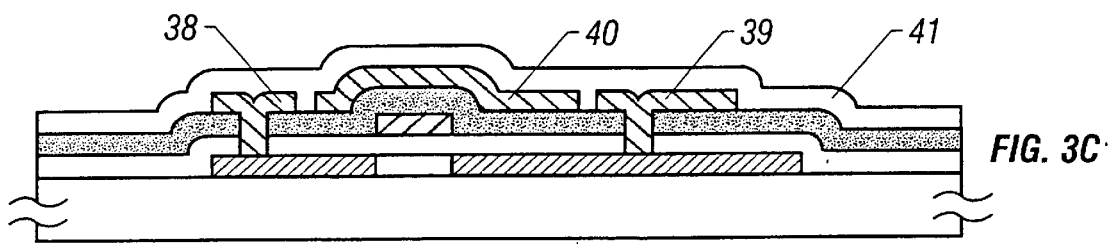

Next, contact holes are formed in the first layer insulator 37 such that they reach the source 35 and drain 36. Then, a source bus line 38, a drain electrode 39, and a protective film 40 are formed. After the above-described steps, a second layer insulator 41 which is a silicon nitride film (or a silicon oxide film) is deposited (FIG. 3C).

Figure 4B:
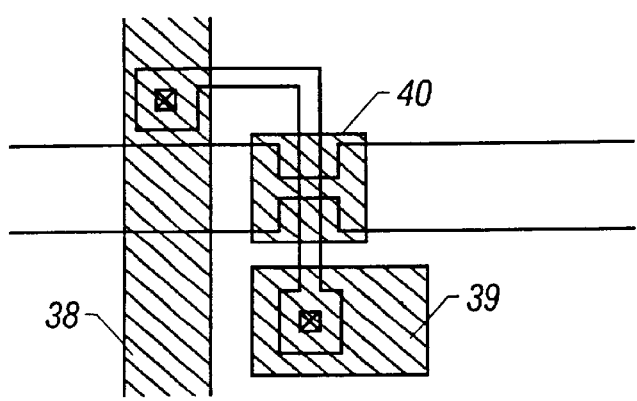

The configuration of the circuit in this state is shown in FIG. 4B. The protective film 40 is insulated from the source bus line 38, the drain electrode 39, and other wiring and electrodes to be at floating potential. Such a protective film 40 is effective in blocking light incident upon the transistor from above (FIG. 4B).

Figure 3D:
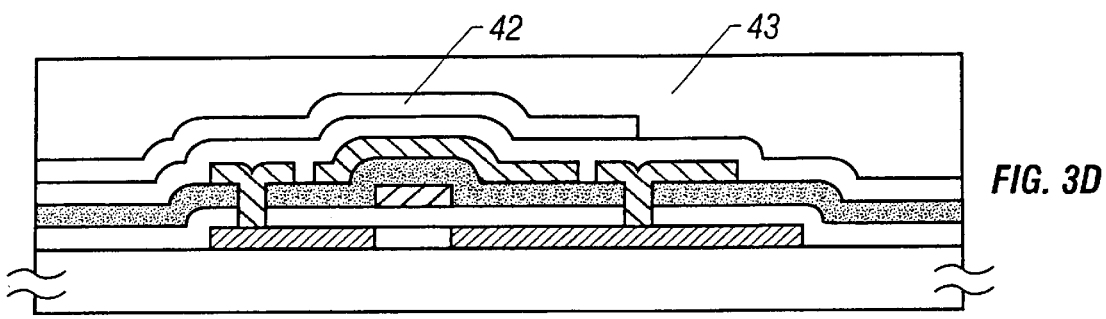

Next, a common electrode 42 is formed by an ITO film. Further, an organic resin layer 43 is formed (FIG. 3D).

Figure 4C:
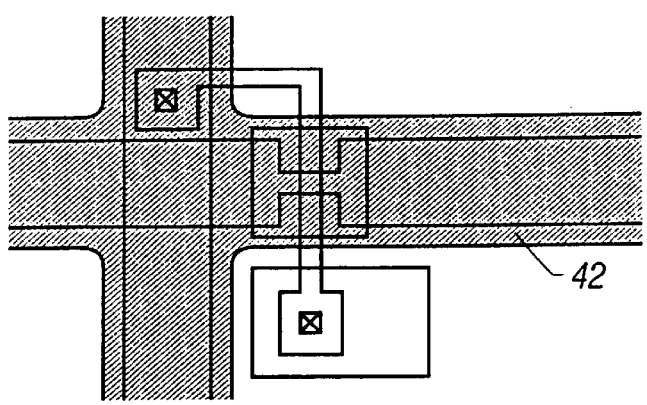

The configuration of the circuit in this state is shown in FIG. 4C. The common electrode is shaded in FIG. 4C to show its position clearly. As apparent from FIG. 4C, the common electrode is formed so as to cover the source bus line and gate bus line. Strictly speaking, it is not essential to cover the protective film 40 with the common electrode. This is because there is a bare possibility that the protective film has some influence on the pixel electrodes as it is at floating potential. In the present embodiment, however, the protective film 40 is also covered by the common electrode 42 as illustrated (FIG. 4C).

Figure 3E:
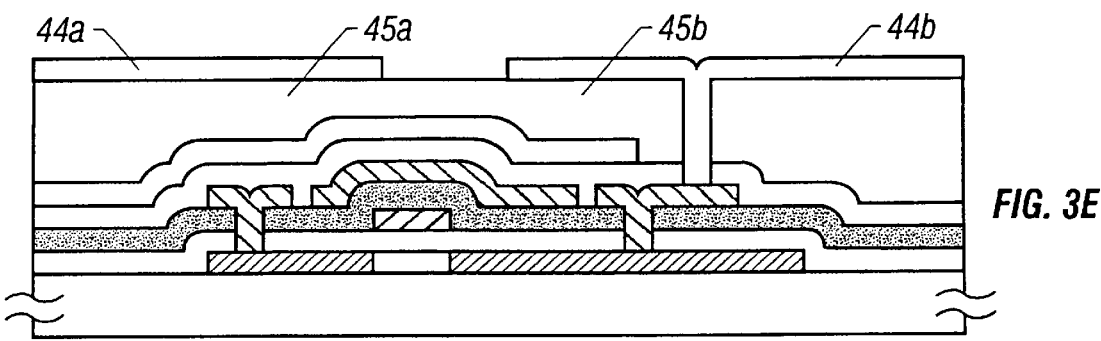

Then, pixel electrodes 44a and 44b are formed by ITO films. The pixel electrode 44b is a pixel electrode for the transistor as described above, and the pixel electrode 44a is a pixel electrode adjacent thereto. Capacitors 45a and 45b are respectively formed at regions where the pixel electrodes 44a and 44b overlap the common electrode 42 (FIG. 3E).

Figure 4D:
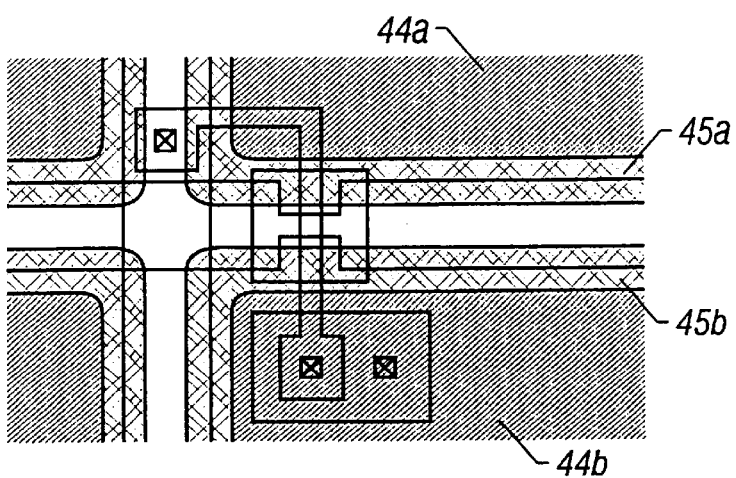

The configuration of the circuit in this state is shown in FIG. 4D. In FIG. 4D, the pixel electrodes and the regions where the pixel electrodes overlap the common electrode (regions where the capacitors are located) are shaded to show their positions clearly. As apparent from FIG. 4D, the pixel electrodes are formed so as to overlap the source bus line and gate bus line. As a result, the boundaries of the pixel electrodes are all located on the bus lines which consequently serve as a black matrix (FIG. 4D).

By forming an electrode opposite to a pixel electrode that constitutes an auxiliary capacitor using a transparent conductive film, a great auxiliary capacitor can be formed without decreasing the aperture ratio. In addition, a source bus line and a gate bus line can be used as a black matrix. More particularly, the present invention is effective especially in improving an aperture ratio when the pixel is small and, especially, with design rules kept unchanged. As described above, the present invention has advantages from an industrial point of view.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of manufacturing a semiconductor device, said method comprising the steps of:
    forming a semiconductor film on an insulating surface;
    forming a gate electrode adjacent to the semiconductor film having a gate insulating film therebetween;
    introducing an impurity into the semiconductor film to form a source region, a drain region, a channel forming region between the source and drain regions;
    forming a first organic resin film over the semiconductor film, the gate insulating film and the gate electrode;
    forming a conductive film on the first organic resin film;
    forming a second organic resin film on the conductive film;
    forming a pixel electrode on the second organic resin film.

2. A method according to claim 1, further comprising the steps of:
    forming a first inorganic layer over the semiconductor film, the gate insulating film and the gate electrode;
    forming a second inorganic layer on the first inorganic layer;
    forming the first organic resin film on the second inorganic layer,
    wherein each of the first and second inorganic layers comprises a material selected from the group consisting of silicon oxide and silicon nitride.

3. A method according to claim 1,
    wherein the semiconductor film comprises crystalline silicon.

4. A method according to claim 1,
    wherein each of the conductive film and the pixel electrode is a transparent conductive film.

5. A method according to claim 1,
    wherein each of the conductive film and the pixel electrode comprises at least one selected from the group consisting of ITO (indium tin oxide) and $SnO_2$.

6. A method of manufacturing a display device, said method comprising the steps of:
    forming a semiconductor film on an insulating surface;
    forming a gate electrode adjacent to the semiconductor film having a gate insulating film therebetween;
    introducing an impurity into the semiconductor film to form a source region, a drain region, a channel forming region between the source and drain regions;
    forming a first organic resin film over the semiconductor film, the gate insulating film and the gate electrode;
    forming a common electrode on the first organic resin film;
    forming a second organic resin film on the common electrode;
    forming a pixel electrode on the second organic resin film.

7. A method according to claim 6, further comprising the steps of:
    forming a first inorganic layer over the semiconductor film, the gate insulating film and the gate electrode;
    forming a second inorganic layer on the first inorganic layer;
    forming the first organic resin film on the second inorganic layer, wherein each of the first and second inorganic layers comprises a material selected from the group consisting of silicon oxide and silicon nitride.

8. A method according to claim 6, wherein the semiconductor film comprises crystalline silicon.

9. A method according to claim 6, wherein each of the common electrode and the pixel electrode is a transparent conductive film.

10. A method according to claim 6, wherein each of the common electrode and the pixel electrode comprises at least one selected from the group consisting of ITO (indium tin oxide) and $SnO_2$.

11. A method of manufacturing a semiconductor device, said method comprising the steps of:

forming a transistor formed over an insulating surface, said transistor including source and drain regions, a channel forming region between the source and drain regions, and a gate electrode adjacent to the channel forming region having a gate insulating film therebetween;

forming a first organic resin film over the transistor;

forming a conductive film on the first organic resin film;

forming a second organic resin film on the conductive film;

forming a pixel electrode formed on the second organic resin film.

12. A method according to claim 11, further comprising the steps of:

forming a first inorganic layer over the semiconductor film, the gate insulating film and the gate electrode;

forming a second inorganic layer on the first inorganic layer;

forming the first organic resin film on the second inorganic layer;

wherein each of the first and second inorganic layers comprises a material selected from the group consisting of silicon oxide and silicon nitride.

13. A method according to claim 11, wherein the source and drain regions, and the channel forming region are formed in a crystalline semiconductor island.

14. A method according to claim 11, wherein each of the conductive film and the pixel electrode is a transparent conductive film.

15. A method according to claim 11, wherein each of the conductive film and the pixel electrode comprises at least one selected from the group consisting of ITO (indium tin oxide) and $SnO_2$.

* * * * *